Patented Nov. 22, 1927.

1,650,106

UNITED STATES PATENT OFFICE

EARL BURNARD ALVORD, OF CLEVELAND, OHIO, ASSIGNOR TO THE GRASSELLI CHEMICAL COMPANY, OF CLEVELAND, OHIO, A CORPORATION OF OHIO.

PROCESS FOR THE PRODUCTION OF SODIUM HYDROSULPHIDE AND VALUABLE BY-PRODUCTS.

No Drawing.     Application filed February 8, 1926. Serial No. 86,938.

The present invention relates to a process whereby sodium hydrosulphide, barium carbonate and barium sulphate are produced from barium sulphide, carbon dioxid, and sodium sulphate.

Heretofore sodium hydrosulphide has been commonly manufactured by treating sodium sulphide with hydrogen sulphide according to the reaction:

$$Na_2S + H_2S \rightarrow 2NaHS$$

This process, while commercially successful, is not entirely satisfactory since it involves among other objectionable features the generation and absorption of large quantities of poisonous hydrogen sulphide gas, operations which are both hazardous and expensive.

My investigations have led to the discovery of a process for the production of sodium of hydrosulphide whereby the objectionable generation and absorption of the hydrogen sulphide is largely or entirely eliminated and a considerable economy in carrying out the process is effected by the production of the valuable by-products, barium sulphate and barium carbonate.

Various other advantages of my invention will appear from a consideration of the following description of its preferred embodiment.

A solution of about 22° Bé. and containing the chemical equivalent of about 16% of BaS such as may be obtained by leaching barium sulphide black ash in the well-known way is charged into closed steel bubblers or equivalent apparatus and gassed with carbon dioxid, preferably of relatively high purity, until substantially 50% of the barium content of the solution corresponding to the barium hydroxid content thereof is precipitated as barium carbonate. The reactions involved in the process thus far described probably are as follows:

$$2BaS + 2H_2O = Ba(OH)_2 + Ba(SH)_2$$
$$Ba(OH)_2 + CO_2 = BaCO_3 + H_2O$$

That is, in the solution of the barium sulphide in water it dissociates into barium hydroxid and barium hydrosulphide and the carbon dioxid treatment transforms the barium hydroxid into the insoluble carbonate thus leaving only the barium hydrosulphide in the solution. By subsequent treatment of the reaction mixture the precipitated barium carbonate is recovered and the barium hydrosulphide is converted into sodium hydrosulphide and barium sulphate, as will be described hereinafter.

In connection with the carbon dioxid treatment described it is noted that the invention is not limited to the use of the precise quantity of carbon dioxid specified since under certain conditions it may be found to be advisable to use a lesser or greater quantity. The use of a smaller quantity of carbon dioxid reduces the yield of barium carbonate and also tends to produce a sodium hydrosulphide product containing sodium sulphide or requiring treatment with hydrogen sulphide to convert the sodium sulphide into hydrosulphide, whereas the use of more carbon dioxid while increasing the yield of barium carbonate and reducing the sodium sulphide content of the sodium hydrosulphide product or reducing the hydrogen sulphide requirements of the process also reduces the yield of sodium hydrosulphide and may, if carried too far, result in the liberation and loss of hydrogen sulphide.

The slurry containing barium carbonate and barium hydrosulphide resulting from the carbon dioxid treatment is separated, preferably by filtration. The barium carbonate press cake, after washing, is re-slurried with water, refiltered, dried and milled and is then ready to market. The filtrate of barium hydrosulphide containing say 11.5% of $Ba(SH)_2$ is treated with a sufficient quantity of sodium sulphate or salt cake solution to precipitate the barium as barium sulphate by a reaction corresponding with the following equation:

$$Ba(HS)_2 + Na_2SO_4 \rightarrow BaSO_4 + 2NaHS$$

The slurry containing barium sulphate and sodium hydrosulphide resulting from this reaction is also preferably separated by filtration. The barium sulphate press cake, after washing, is re-slurred with water containing sufficient sulphuric acid to neutralize any alkaline salts present and convert the slimy precipitate into one having a dense crystalline structure. This precipitate is then re-filtered and prepared in the usual manner for the market as blanc fix.

The sodium hydrosulphide solution, that is, the filtrate from the barium sulphate slurry to which preferably is added the washings from the barium sulphate precipitate, under the conditions described will have a sodium hydrosolphide content of about 5.6%. This solution may be used directly or worked up in any suitable way. A preferred procedure is to concentrate the solution to about 35% sodium hydrosulphide and then, since the solution produced as described ordinarily contains an excess of sodium sulphide amounting to about 10%, it may be gassed with hydrogen sulphide to convert this sodium sulphide to the hydrosulphide.

Among the advantages of the process in addition to those already mentioned are the lower cost and higher quality of the sodium hydrosulphide than sodium hydrosulphide produced as usual by the reduction of salt cake and treatment of the resulting sodium sulphide with hydrogen sulphide. The barium sulphate and barium carbonate produced are sufficiently pure for commercial use and the relative quantities thereof produced are such that both may be disposed of at satisfactory prices.

As will be obvious to those skilled in this particular art, various modifications may be made in the specific precedure described above. The barium sulphide, for example, may be replaced by strontium sulphide or by other sulphides having substantially similar properties. This and similar modifications fall within the scope of my invention unless they are precluded by the terms of the appended claim. It is understood that the invention is not limited to any particular theory regarding the chemical reactions involved.

I claim:

In a process for the production of sodium hydrosulphide the steps which consist in treating a solution of barium sulphide with carbon dioxid in a variable amount, up to about one-half the chemical equivalent of the barium content of the solution, depending upon the amount of sodium sulphide desired in the product, and separating the resulting barium carbonate from the solution.

In testimony whereof, I affix my signature.

EARL BURNARD ALVORD.